United States Patent
Adachi et al.

[11] Patent Number: 5,992,595
[45] Date of Patent: Nov. 30, 1999

[54] HUB CLUTCH ASSEMBLY

[75] Inventors: Kenro Adachi; Takayuki Norimatsu, both of Shizuoka, Japan

[73] Assignee: NTN Corporation, Osaka, Japan

[21] Appl. No.: 09/160,041

[22] Filed: Sep. 25, 1998

[30] Foreign Application Priority Data

Sep. 26, 1997 [JP] Japan .................................. 9-261894
Sep. 29, 1997 [JP] Japan .................................. 9-264208

[51] Int. Cl.⁶ .............................. F16D 25/061; F16J 15/00
[52] U.S. Cl. ........................................ 192/69.41; 277/637
[58] Field of Search .............................. 192/69.41, 88 A, 192/91 A, 112; 277/630, 637

[56] References Cited

U.S. PATENT DOCUMENTS

| | | | |
|---|---|---|---|
| 5,085,304 | 2/1992 | Barroso | 192/69.41 |
| 5,560,619 | 10/1996 | Acree | 277/637 |
| 5,871,072 | 2/1999 | Itoh et al. | 192/69.41 |

*Primary Examiner*—Rodney H. Bonck
*Attorney, Agent, or Firm*—Wenderoth, Lind & Ponack, L.L.P.

[57] ABSTRACT

A hub clutch assembly has a cover and a gasket which can be easily mounted to an end of the cover. In a hub clutch assembly in which an end of a wheel hub is closed by a cover tightened with a gasket sandwiched therebetween, the cover is formed with positioning grooves along its inner edge. Along its inner edge, the gasket is formed with positioning claws to be engaged in the grooves and claws to be press-fitted into the cover to prevent the gasket from coming off the cover. The gasket can thus be mounted to the cover simply by inserting the claws into the cover.

8 Claims, 7 Drawing Sheets

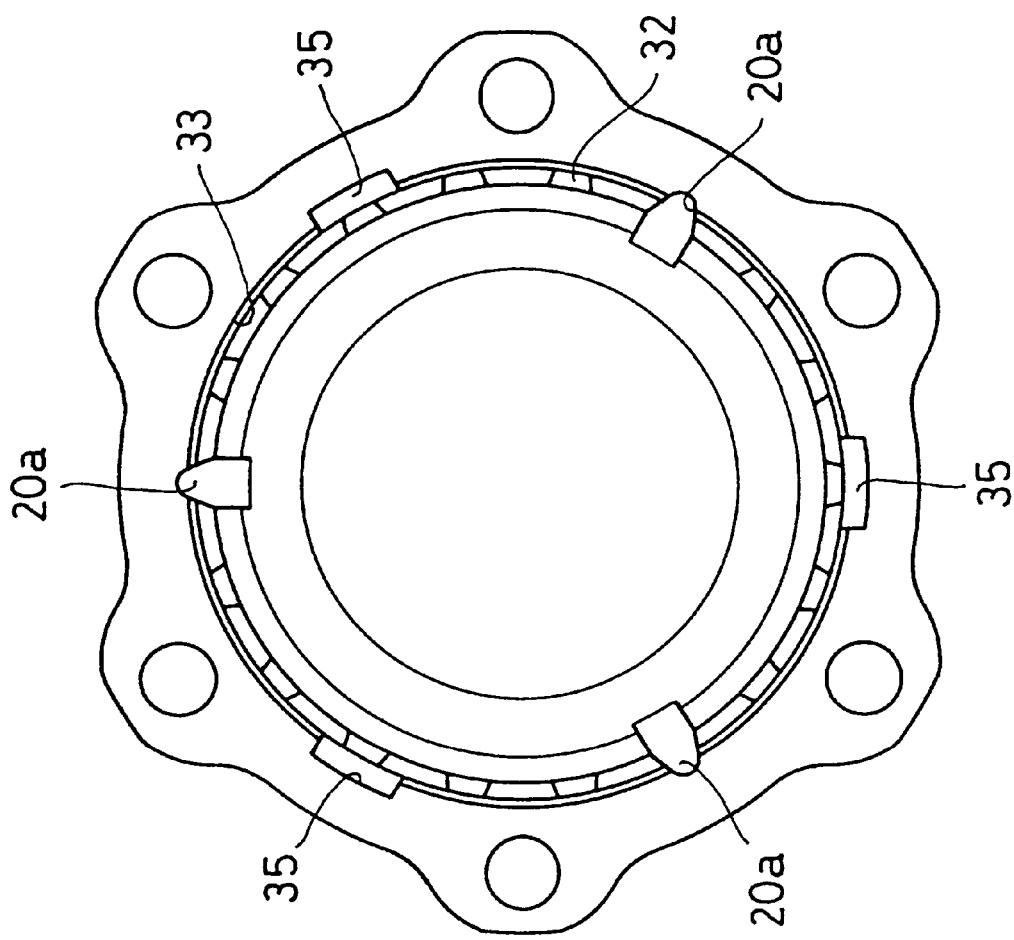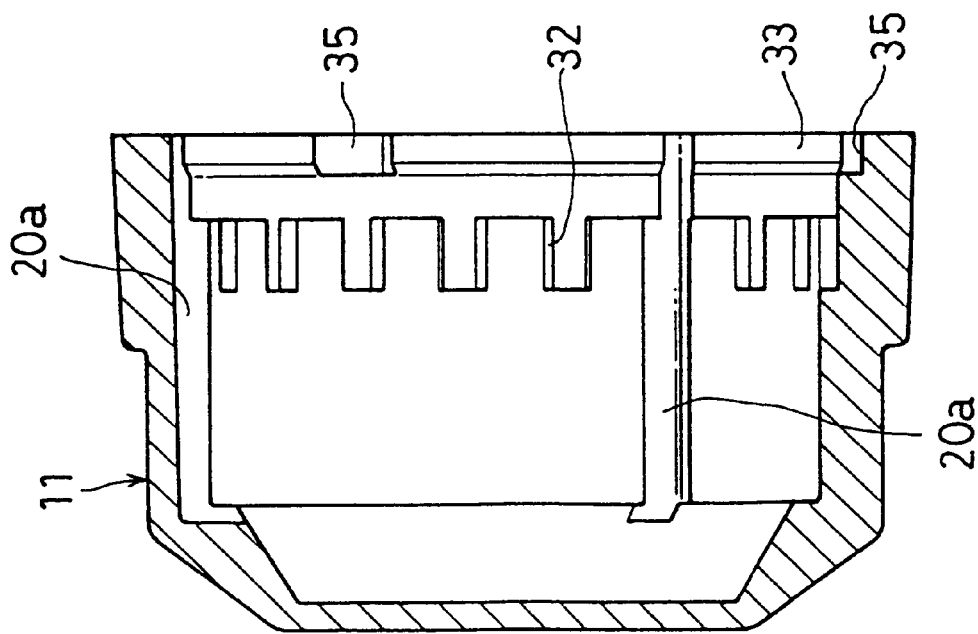

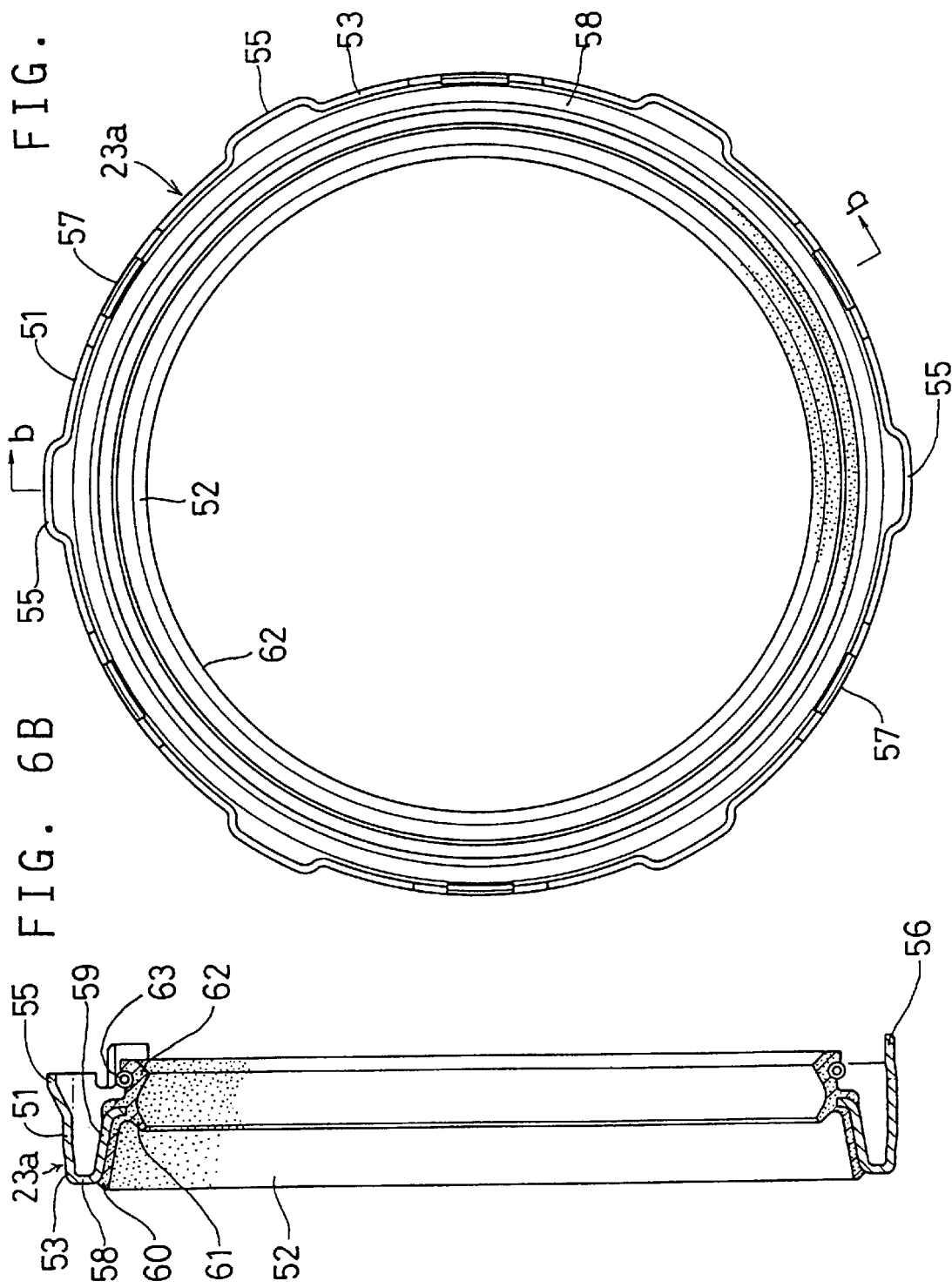

HUB CLUTCH ASSEMBLY

BACKGROUND OF THE INVENTION

This invention relates to a hub clutch assembly mounted to each front wheel of a four-wheel drive vehicle for changing over between transmission and cutoff of the driving force between the axle and the wheel hub and, more particularly to an arrangement for mounting a gasket used to airtightly close an end of the wheel hub with a cover, and to an arrangement for mounting a seal for shutting off two fluid passages for changeover between transmission and cutoff of the driving power.

In a part-time four-wheel drive vehicle, hub clutches are mounted between the front wheel hubs and the axle to change over the state of transmission of the driving force to the wheels.

FIG. 7 shows a hub clutch assembly 1 that utilizes air pressure for changeover of driving force. A spindle 3 is fitted on a front wheel axle 2 and fixed to a vehicle knuckle while rotatably supporting a wheel hub 5 through a bearing 4.

An inner ring 6 as a driving member of the hub clutch assembly 1 is axially slidably but relatively nonrotatably mounted on the front wheel axle 2 at its tip by serrations 7. The inner ring 6 has an external gear 8 on its outer periphery. An outer ring 9 as a driven member is rotatably mounted around the inner ring 6. The outer ring 9 is relatively nonrotatably mounted in a cover 11 fixed to an end of the wheel hub 5 by a plurality of bolts 10. The outer ring 9 has an internal gear 12 in its inner periphery with which the external gear 8 is adapted to move into and out of meshing engagement.

The end face of the wheel hub 5 is closed by the cover 11 tightened by the bolts 10 through a gasket 13. The interior of the cover 11 is kept airtight by a sleeve 26, diaphragm 14, and a yoke 24'. The diaphragm 14 is secured by the sleeve 26 and the yoke 24'. The diaphragm 14 has its inner edge coupled airtightly to the inner ring 6 so as to be axially movable with the inner ring 6. The interior of the cover 11 is thus divided into airtight chambers 15 and 16 by the diaphragm 14. The gasket 13 prevents the entry of water and air into the cover, thus keeping the interior of the cover airtight.

A spring 17 is mounted in a compressed state between opposed surfaces of the diaphragm 14 and the cover 11, biasing the inner ring 6 toward its rearward position. A magnet 19 is fixed through a case to the inner side of the cover 11 at its center to attract a washer 18 for fixing the diaphragm 14 when the inner ring 6 is in its forward position and, thus keeping the external gear 8 away from the internal gear 12.

To move the inner ring 6 for controlling changeover between the two-wheel drive state and the four-wheel drive state, air passages 20 and 21 are provided so as to communicate with the respective airtight chambers 15 and 16, respectively.

The first air passage 20 communicating with the outer airtight chamber 15, is comprised of a passage 20a formed in the cover 11 so as to communicate with the airtight chamber 15, a gap 20b defined between the spindle 3 and the wheel hub 5, a space formed in the bearing 4 mounted in the gap 20b, and a passage 20c formed in the rear portion of the spindle 3. An air pipe 20d connected to the passage 20c is connected to an air source.

The second air passage 21 communicating with the inner airtight chamber 16, is comprised of a gap 21a between the axle 2 and the spindle 3, and a passage 21b formed in the rear portion of the spindle 3. An air pipe 21c connected to the passage 21b is connected to the air source.

The airtight chambers 15 and 16 are kept airtight by a seal 23 fitted in the cover 11 and pressed against a nut 22 tightened onto the tip of the spindle 3. Since the first air passage 20 is provided between the spindle 3 and the wheel hub 5 and the second air passage 21 is provided between the front wheel axle 2 and the spindle 3, spaces and gaps in the wheel hub 5 can be used as parts of the air passages. This leads to a reduced diameter of the entire hub clutch assembly 1.

For changeover to the four-wheel drive mode, the inner ring 6 is moved inwardly to mesh the external gear 8 with the internal gear 12.

The front wheel axle 2 and the wheel hub 5 are thus directly coupled together (for four-wheel drive mode), and also the engine braking force can now be delivered to both front and rear wheels.

For changeover from four-wheel to two-wheel drive mode, air in the outer airtight chamber 15 is sucked out to create a pressure difference on both sides of the diaphragm 14. This pressure difference pulls the diaphragm 14 outwardly together with the inner ring 6 against the force of the spring 17 until the diaphragm fixing washer 18 is attracted by the magnet 19 toward the cover 11, thus separating the external gear 8 from the internal gear 12 as shown in FIG. 7.

Thus, the hub clutch assembly 1 can be changed over between the the two-wheel and four-wheel drive modes by applying a negative pressure or a positive pressure in one of the airtight chambers 15 and 16 on both sides of the diaphragm 14. The two-wheel drive mode is maintained with the magnet 19 attracting the diaphragm fixing washer 18 toward the cover 11. The four-wheel drive mode is maintained by the force of the spring 17.

The gasket 13 is provided between end faces of the wheel hub 5 and the cover 11 to prevent air leakage. Heretofore, the gasket 13 was bonded to the end face of the cover 11 when the component parts of the hub clutch were mounted in the cover. The hub clutch assembly thus formed was delivered to a car manufacturer.

Bonding of the gasket to the cover constitutes a separate step from other assembling steps. Thus, this step impairs assembling efficiency.

An object of this invention is to provide a hub clutch which needs no bonding of the gasket to the cover and thus can be assembled with higher efficiency.

The seal 23 provided between the two passages leading to the respective airtight chambers to prevent air leakage between the two passages comprises a core member 25 having such an outer diameter that it can snugly fit in the cover 11 and having a ]-shaped section, and a seal member 24 fixed to the inner edge of the core member 25 in slide contact with the outer periphery of the nut member 22 threaded onto the spindle 3. The core member 25 meshes with the inner periphery of the cover 11 and bears against the outer ring 9 while the seal member 24 is in slide contact with the nut member 22 to shut off the passages 20 and 21 from each other.

Since the core member 25 simply engages the inner periphery of the cover 11, it has neither the function of preventing the rotation of the seal relative to the cover 11 nor the function of axially positioning the seal. Thus, the seal tends to shift, resulting in poor sealing for shutting off the passages 20 and 21 from each other.

Another object of this invention is to provide a hub clutch assembly which can hold the seal in position relative to the cover, thus maintaining the sealing function with high reliability.

SUMMARY OF THE INVENTION

According to the present invention, there is provided a hub clutch assembly comprising a wheel hub and a cover secured to an end of the wheel hub with a gasket sandwiched therebetween to close the end of the wheel hub, a driving member coupled to an axle, and a driven member coupled to the wheel hub and mounted around the driving member so as to be rotatable together with the driving member, the driving and driven members being selectively coupled together and uncoupled from each other, the cover having a plurality of positioning grooves formed in inner periphery at one end on which the gasket is to be mounted, the gasket having, along its inner periphery, a plurality of positioning claws to be engaged in the grooves.

There is also provided a hub clutch assembly comprising a spindle, a cover sealing an end of a wheel hub, a driving member coupled to an axle, a driven member coupled to the wheel hub, the driving member being adapted to be moved into and out of engagement with the driven member by supplying and discharging pressure fluid, and a seal means fitted in the cover so as to abut the driven member to seal the pressure fluid, the seal means comprising a core member fitted in the cover, and a seal member fixed to the inner peripheral side of the core member and slidably engaging the spindle, the cover being formed in inner periphery thereof with a plurality of recesses, the core member having an outer peripheral wall formed with protrusions extending outwardly from the outer peripheral wall to be received in the recesses formed in the cover, thereby preventing the seal means from rotating relative to the cover.

Other features and objects of the present invention will become apparent from the following description made with reference to the accompanying drawings, in which:

BRIEF DESCRIPTION OF THE DRAWINGS

FIG. 2A is a front view of the cover;

FIG. 2B is a vertical sectional view of the cover;

FIG. 6A is a front view of a seal member;

FIG. 6B is a vertical sectional view taken along line b—b of FIG. 6A; and

DETAILED DESCRIPTION OF THE PREFERRED EMBODIMENT

Figure 7:
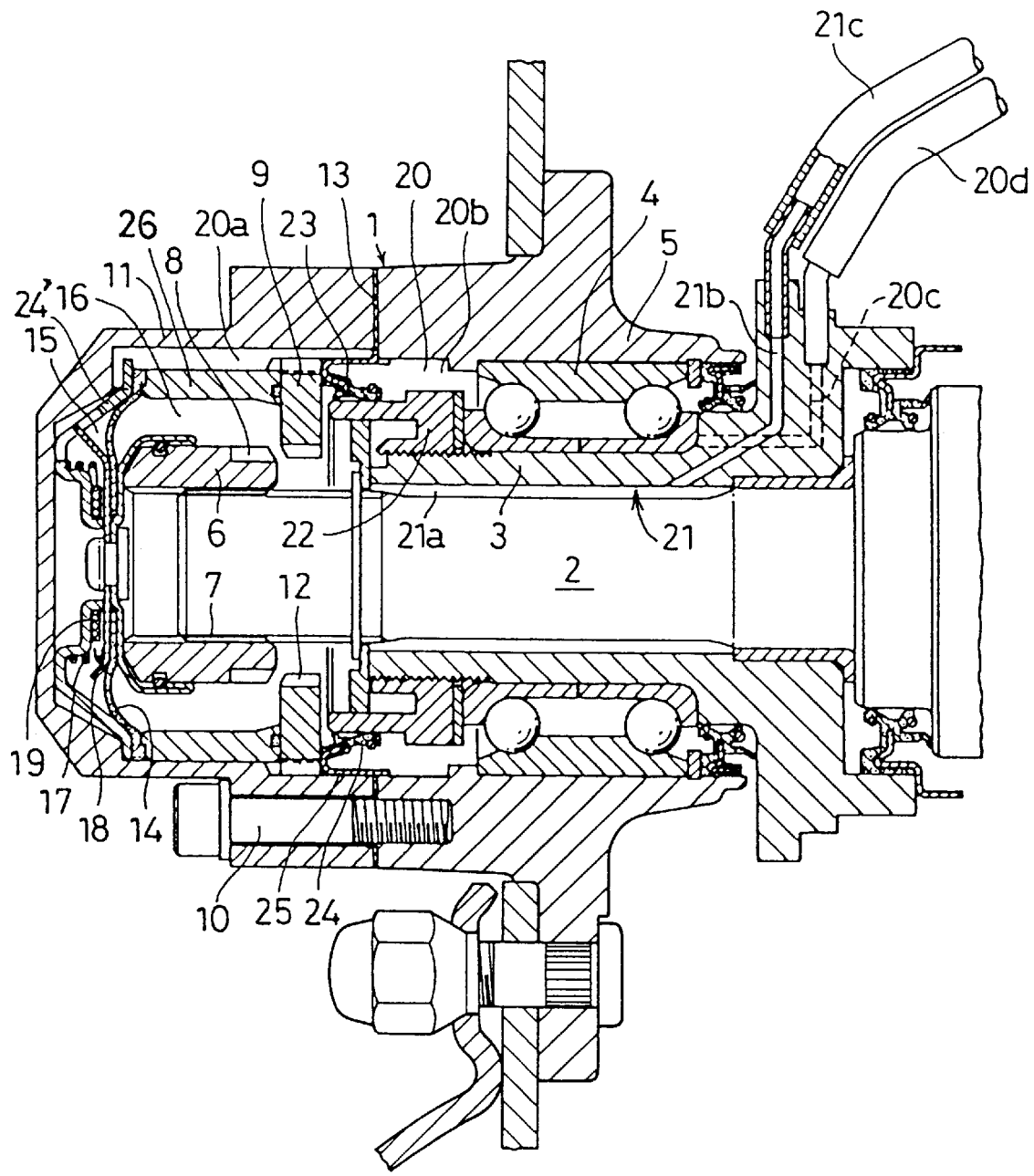
FIG. 7 is a vertical sectional view of a prior art hub clutch assembly.

An embodiment of this invention is described with reference to the drawings. The hub clutch assembly of the embodiment is the same in its basic structure as the conventional one shown in FIG. 7. Thus, the following description is limited to what differs from this prior art assembly.

Figure 1A:
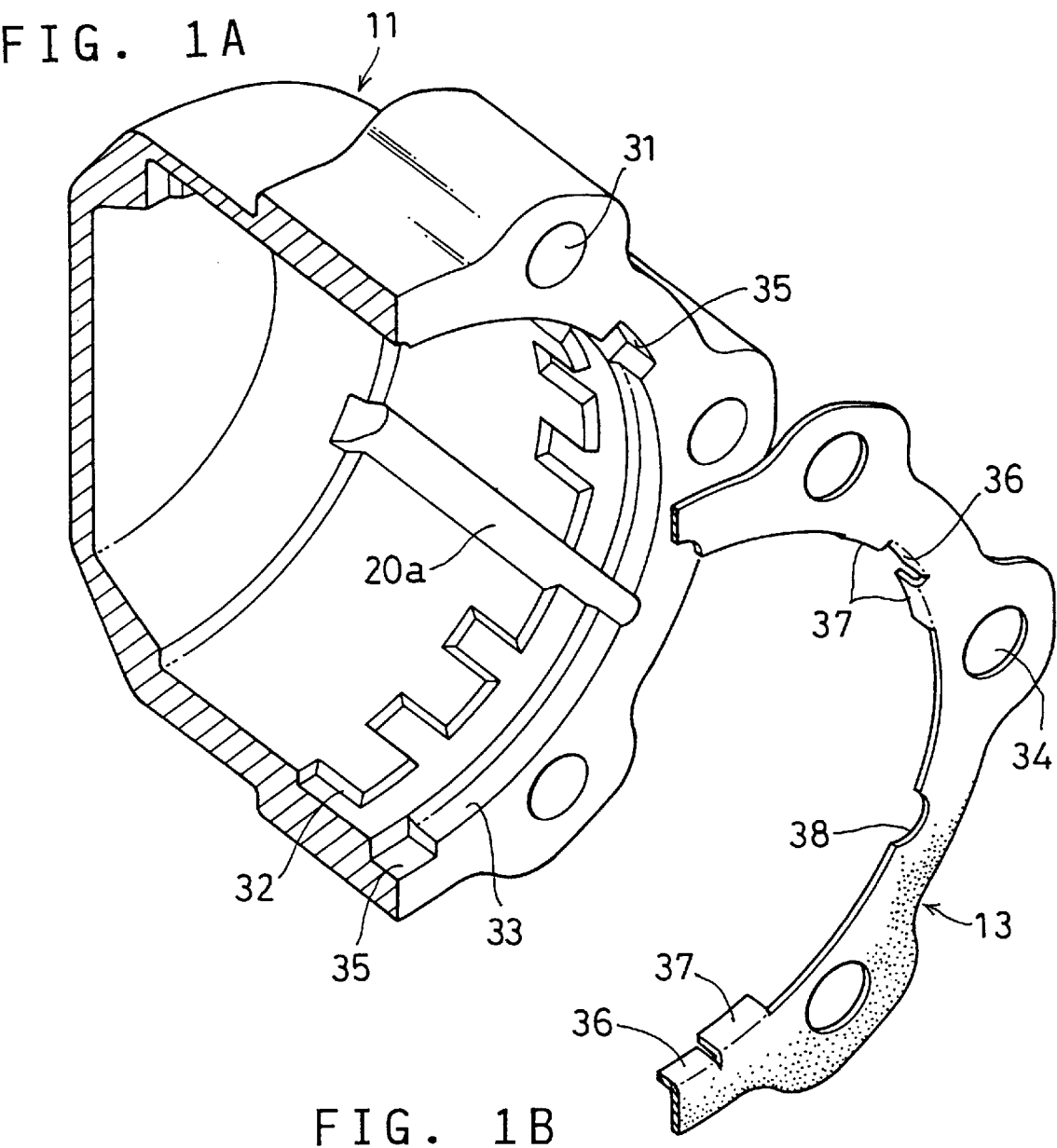
FIG. 1A is an exploded perspective view of a cover and a gasket.
Figure 1B:
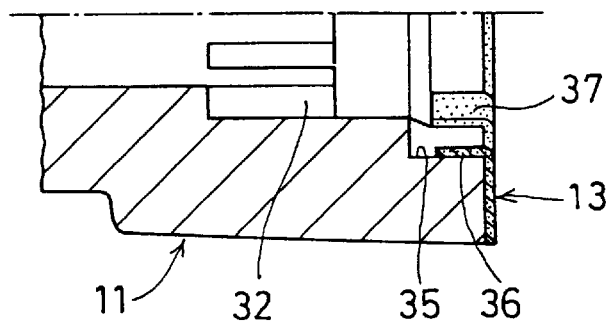
FIG. 1B is a partial enlarged sectional view of the gasket mounted to the cover.
Figure 3A:
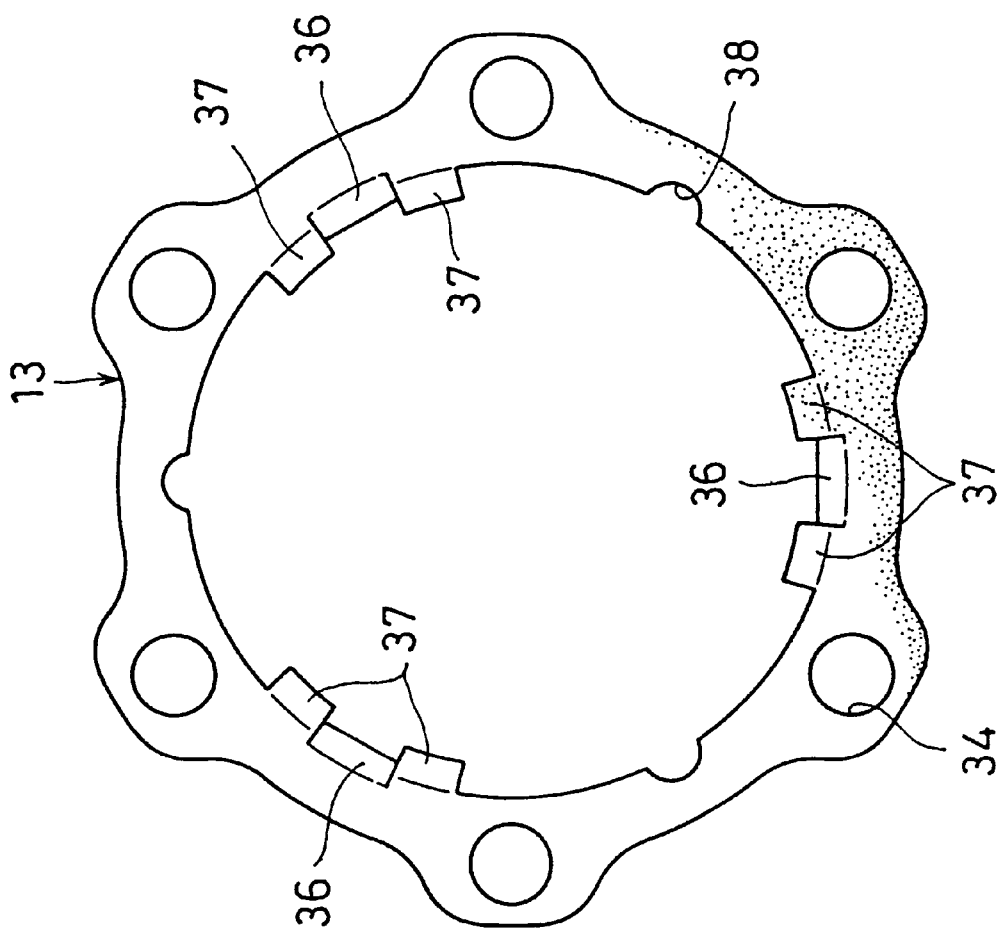
FIG. 3A is a front view of the gasket.
Figure 3B:
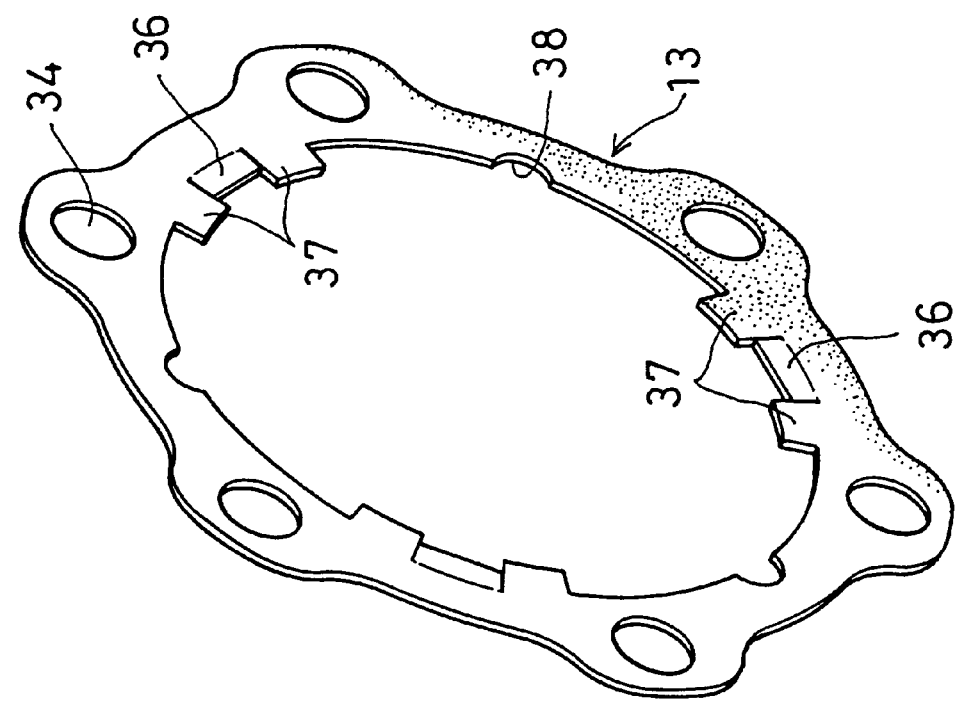
FIG. 3B is a perspective view of the gasket.

As shown in FIGS. 1 and 2, the cover 11 is a substantially cylindrical member with a closed front end and formed with a plurality of axial bolt holes 31 in its outer periphery. In its inner peripheral surface, the cover 11 is formed with axial groove-shaped passages 20a and spline grooves 32 near the opening. The grooves 32 engage the outer ring 9 inserted into the cover 11 near its opening to prevent its rotation relative to the cover. Formed near the opening is a large-diameter shoulder portion 33 into which the seal 23 is press-fitted.

The gasket 13 to be interposed between end faces of the cover 11 and the wheel hub 5 has its inner and outer edges shaped identically to the inner and outer edges of the end face of the cover 11, and is formed with holes 34 through which the bolts 10 are inserted. The wheel hub 5 has its end face similarly shaped, too.

In the end face of the cover 11, a plurality of gasket positioning grooves 35 are formed so as not to interfere with the passages 20a. The depth of the grooves 35 is equal to or greater than the thickness of the gasket 13.

Along its inner edge, the gasket 13 has integral positioning claws 36 bent in the same direction so as to engage in the respective grooves 35 in the cover 11 when the gasket 13 is superposed on the end face of the cover 11, integral claws 37 provided on both sides of each claw 36 and bent in the same direction as the claws 36 so as to be press-fitted between the large-diameter shoulder portion 33 and the seal 23 to prevent the gasket from coming off the cover, and cutouts 38 adapted to align with the passages 20a.

To assemble the hub clutch assembly of this invention, with the component parts of the hub clutch mounted in the cover 11, the gasket 13 is mounted to the cover 11 by superposing the gasket 13 on the cover 11 so that the positioning claws 36 fit in the grooves 35 and the claws 37 are press-fitted between the large-diameter shoulder portion 33 and the seal 23. In this state, the gasket 13 is positioned with respect to the end face of the cover 11 by the engagement of the claws 36 in the grooves 35, while the gasket 13 is prevented from coming off the cover 11 by the press-fitting of the claws 37 between the large-diameter shoulder 33 and the seal 23. The hub clutch assembly is delivered to a manufacturer in this state.

According to this invention, the gasket can be mounted to the end face of the cover simply by inserting the claws of the gasket into the cover. Bonding is not necessary. Hub clutches can thus be assembled with high efficiency.

The press-fitted claws prevent the gasket from coming off the cover during transportation or assembling. This makes assembling more easy.

Figure 4:
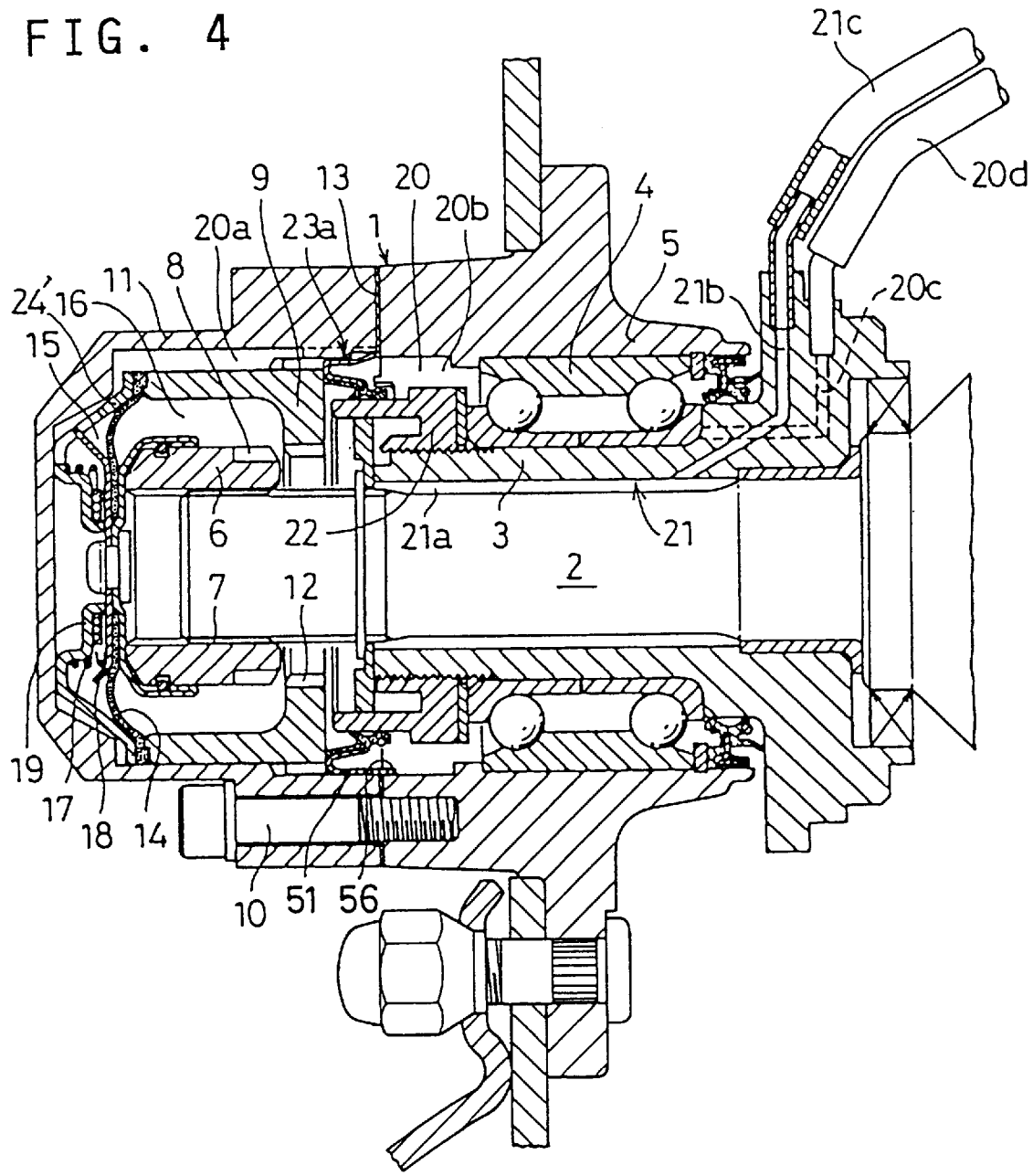
FIG. 4 is a vertical sectional view of another embodiment.
Figure 5A:
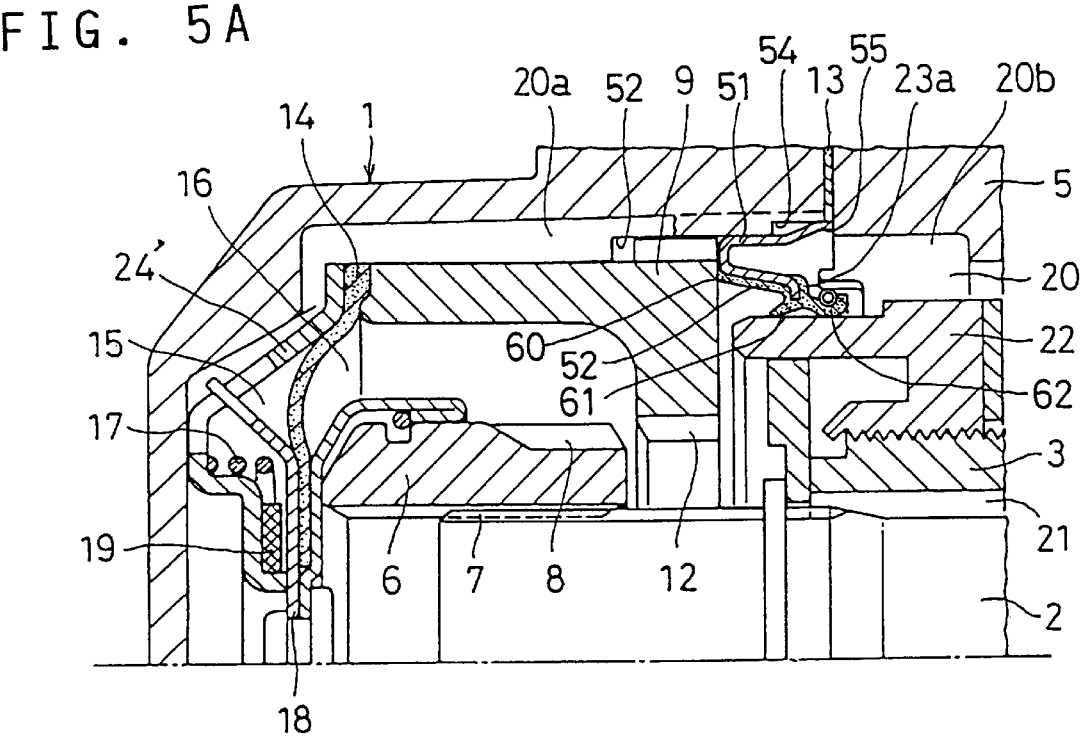
FIG. 5A is a partial enlarged sectional view of the same in two-wheel drive mode.
Figure 5B:
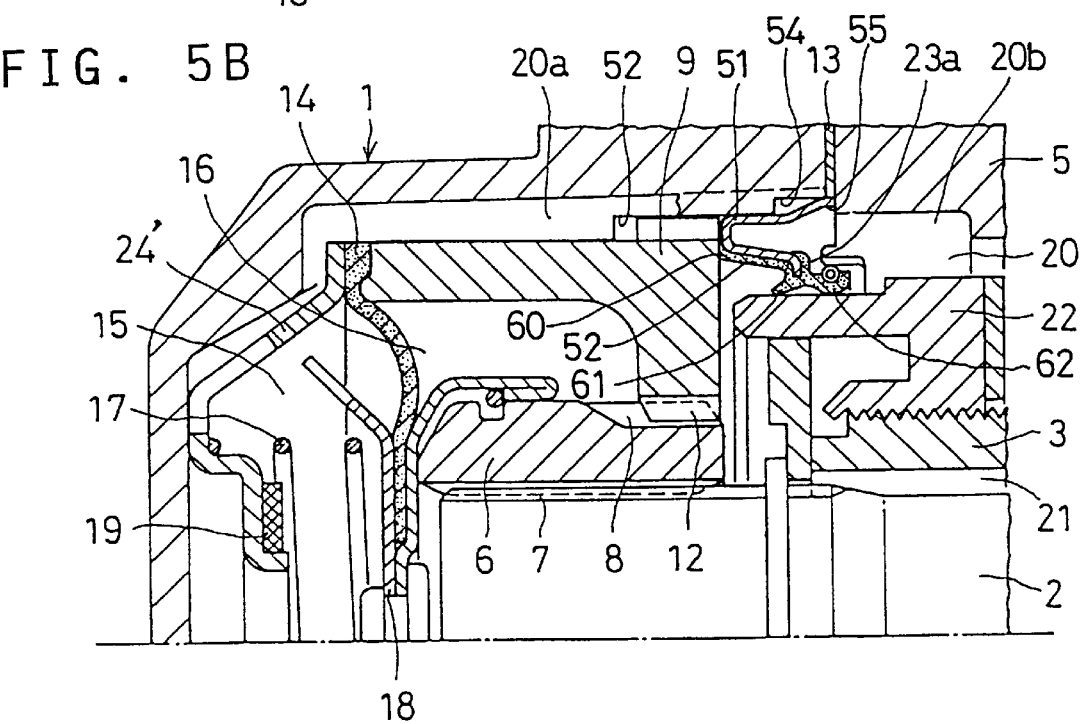
FIG. 5B is a similar view in four-wheel drive mode.

FIGS. 4–6 show another embodiment in which a seal 23a mounted in the cover 11 near its opening comprises a core member 51 having a ]-shaped section, and a seal member 52 fixed to the inner edge of the core member 51. The core member 51 has such an outer diameter that its outer peripheral wall 53 fits snugly in the cover 11, and the core member 51 is formed with a plurality of rotation-preventive protrusions 55 protruding outwardly to be received in recesses 54 formed in the inner periphery of the cover 11, a plurality of extensions 56 protruding axially from the outer peripheral wall 53 into the wheel hub 5, and cutouts 57 through which the passages 20a and 20b communicate with each other.

The protrusions 55 protrude outwardly from the outer peripheral wall 53, and have end faces abutting the end face of the wheel hub 5. Thus, the protrusions 55 prevent rotation of the seal 23a in the radial direction relative to the cover 11, and also serve to axially position the seal 23a.

An end wall 58 of the core member 51 abuts the outer ring 9. The seal member 52 fixed to an inner peripheral wall 59 of the core member 51 has an end portion or seal portion 60 superposed on the inner peripheral wall 59 and abutting the outer ring 9. A portion protruding from the end of the inner peripheral wall 59 has a sealing lip 61 abutting the nut member 52 and a seal portion 62 spaced from the lip 61 and abutting the outer periphery of the nut member 52. The seal portion 62 is pressed against the nut member 52 by an annular coil spring mounted therearound.

The seal 23a mounted in the end of the cover 11 has the protrusions 55 of the core member 51 fitted in the recesses 54 of the cover 11. The protrusions 55 have their end faces abutting the end face of the wheel hub 5, thus preventing the seal 23a from rotating relative to the cover 11 and from coming off the cover. The aluminum cover 11 will thus never be damaged by the seal. The seal member 52 maintains positioning and sealing functions relative to both the outer ring 9 and the nut member 52, thus shutting off the passages 20 and 21 from each other.

According to this invention, the seal for shutting off the two air passages from each other can be prevented from rotating relative to the cover and from coming off the cover. The air passages can thus be shut off reliably. Since the core member does not rotate relative to the cover, the durability of the aluminum cover improved.

What is claimed is:

1. A hub clutch assembly comprising a wheel hub and a cover secured to an end of said wheel hub with a gasket sandwiched therebetween to close the end of said wheel hub, a driving member coupled to an axle, and a driven member coupled to said wheel hub and mounted around the driving member so as to be rotatable together with said driving member, said driving and driven members being selectively coupled together and uncoupled from each other, said cover having a plurality of positioning grooves formed in its inner periphery at one end on which said gasket is to be mounted, said gasket having, along its inner periphery, a plurality of positioning claws to be engaged in said grooves.

2. A hub clutch assembly as claimed in claim 1 wherein said gasket has, along its inner periphery, a plurality of claws to be press-fitted in said cover to prevent said gasket from coming off said cover.

3. A hub clutch assembly as claimed in claim 2 wherein said driving member and said driven member are coupled together and uncoupled from each other by controlling a flow of pressure fluid.

4. A hub clutch assembly as claimed in claim 1 wherein said driving member and said driven member are coupled together and uncoupled from each other by controlling a flow of pressure fluid.

5. A hub clutch assembly comprising a spindle, a cover sealing an end of a wheel hub, a driving member coupled to an axle, a driven member coupled to the wheel hub, said driving member being adapted to be moved into and out of engagement with said driven member by supplying and discharging pressure fluid, and a seal means fitted in said cover so as to abut said driven member to seal the pressure fluid, said seal means comprising a core member fitted in said cover, and a seal member fixed to the inner peripheral side of said core member and slidably engaging said spindle, said cover being formed in its inner periphery with a plurality of recesses, said core member having an outer peripheral wall formed with protrusions extending outwardly from said outer peripheral wall to be received in said recesses formed in said cover, thereby preventing said seal means from rotating relative to said cover.

6. A hub clutch assembly as claimed in claim 5 wherein said outer peripheral wall of said core member is formed with extensions extending axially from said outer peripheral wall toward said wheel hub.

7. A hub clutch assembly as claimed in claim 6 wherein pressure fluid as supplied into and discharged from two airtight chambers through two independent passages.

8. A hub clutch assembly as claimed in claim 5 wherein pressure fluid is supplied into and discharged from two airtight chambers through two independent passages.

* * * * *